United States Patent [19]
Birnbaum

[11] Patent Number: 5,797,128
[45] Date of Patent: Aug. 18, 1998

[54] SYSTEM AND METHOD FOR IMPLEMENTING A HIERARCHICAL POLICY FOR COMPUTER SYSTEM ADMINISTRATION

[75] Inventor: William C. Birnbaum, Colorado Springs, Colo.

[73] Assignee: Sun Microsystems, Inc., Palo Alto, Calif.

[21] Appl. No.: 856,038

[22] Filed: May 14, 1997

Related U.S. Application Data

[63] Continuation of Ser. No. 497,729, Jul. 3, 1995, abandoned.

[51] Int. Cl.$^6$ .................................................... G06F 17/30
[52] U.S. Cl. .................. 707/5; 707/3; 395/186; 395/726; 395/728; 711/163
[58] Field of Search .................... 707/5, 3; 395/186, 395/726, 728; 711/163

[56] References Cited

U.S. PATENT DOCUMENTS

| | | | |
|---|---|---|---|
| 4,584,639 | 4/1986 | Hardy | 364/200 |
| 4,914,590 | 4/1990 | Loatman et al. | 364/419 |
| 5,129,083 | 7/1992 | Cutler et al. | 395/600 |
| 5,159,685 | 10/1992 | Kung | 395/575 |
| 5,276,775 | 1/1994 | Meng | 395/55 |
| 5,278,946 | 1/1994 | Shimada et al. | 395/62 |
| 5,321,841 | 6/1994 | East et al. | 395/725 |
| 5,390,282 | 2/1995 | Koza et al. | 395/13 |
| 5,414,812 | 5/1995 | Filip et al. | 707/103 |
| 5,421,004 | 5/1995 | Carpenter et al. | 395/575 |
| 5,530,861 | 6/1996 | Diamant et al. | 395/650 |
| 5,544,316 | 8/1996 | Carpenter et al. | 395/200.03 |
| 5,548,726 | 8/1996 | Pettus | 395/200.09 |
| 5,550,971 | 8/1996 | Brumner et al. | 395/161 |
| 5,551,031 | 8/1996 | Cheng et al. | 395/600 |
| 5,552,995 | 9/1996 | Sebastian | 364/468.03 |
| 5,553,218 | 9/1996 | Li et al. | 395/148 |
| 5,555,346 | 9/1996 | Gross et al. | 395/51 |
| 5,559,958 | 9/1996 | Farrand et al. | 395/183.03 |
| 5,561,798 | 10/1996 | Haderle et al. | 395/600 |

OTHER PUBLICATIONS

Hu et al., "Toward an authorization mechanism for user–role based security in an objected design model", IEEE, pp. 195–202, Jul. 1993.

Robinson et al., "A new approach to distributed system management", IEEE, pp. 154–163, Sep. 1988.

Moffett et al., "Policy hierarchies for distributed systems management", IEEE, pp. 404–414, Jun. 1992.

IBM Technical Disclosure, vol. 34, No. 10B, pp. 309–310, Mar. 1992.

X/Open Management Services for an OMG Environment (Draft 0.4), Nov. 1994.

Moffett, Jonathan D. and Sloman, Morris S., "The Representation of Policies as System Objects," Nov. 1991, SIGOIS Bulletin vol. 12, No. 2 & 3, pp. 171–184.

Moffett, Jonathan D. and Sloman, Morris S., "Policy Conflict Analysis in Distributed System Management," Apr. 12, 1993, scheduled to appear in the Journal of Organizational Computing, pp. 1–19.

(List continued on next page.)

*Primary Examiner*—Thomas G. Black
*Assistant Examiner*—Jean M. Corrielus
*Attorney, Agent, or Firm*—William J. Kubida; Richard A. Bachand; Holland & Hart LLP

[57] ABSTRACT

A system and method for implementing a hierarchical policy for computer system administration which is extremely flexible in assigning policies to managed objects. Policies are defined to be rules for the values of the attributes of managed objects. Policy groups comprise the basic building blocks and they associate a set of policies with a set of managed objects. Policy groups can also be members of other policy groups and a policy group inherits the policies of its parent policy groups supporting the hierarchical specification of policy. A given policy group may have multiple parents which allows the "mix-in" of policies from the parents. Cloning and templates in conjunction with validation policies and policy groups provide standardization and a concomitant reduction in system administration complexity.

51 Claims, 12 Drawing Sheets

OTHER PUBLICATIONS

Rumbaugh, J., Blaha, M., Premerlan, W., Eddy, F. and Lorensen, W., "Object–Oriented Modeling and Design," Ch. 3, Object Modeling, 3.1.2 Classes, pp. 22, No date.

Sloman, Morris S., Moffett, Jonathan D. and Twidle, Kevin P., "Domino Domains and Policies: An Introduction to the Project Results," Domino Paper Arch/IC/4, Feb. 20, 1992, Dept. of Computing, Imperial College, University of London, Ch. 17, pp. 1–20.

X/Open Company Ltd., X/Open Preliminary Specification, "Systems Management: Management Services for an OMG Environment (Draft 0.4)," Dec. 19, 1994, Ch 1–6, pp. 1–215.

*"Group Membership View," IBM Technical Disclosure Bulletin, vol. 34, No. 10B, Mar. 1992, New York, NY, pp. 309–310.

* Moffett, J.D. et al., "Policy Hierarchies for Distributed Systems Management," IEEE Journal on Selected Areas in Communications, Dec. 1993, vol. 11, No. 9, New York, NY, ISSN 0733–8716, pp. 1404–1414.

*Robinson, D.C., et al., "Domains: A New Approach to Distributed System Management," Proceedings: Workshop on the Future Trends of Distributed Computing Systems in the 1990s (Cat. No. 88TH0228-7), Hong Kong, Sep. 14–16, 1988, ISBN 0–8186–0897–8, 1988, Washington DC, IEEE Compt. Soc. Press, pp. 154–163.

*"Using Policy Domains to Delegate Administrative Authority in Distributed System Managed Storage," IBM Technical Disclosure Bulletin, vol. 36, No. 8, Aug. 1993, New York, NY, pp. 135–138.

*"Object Oriented user Administration," IBM Technical Disclosure Bulletin, vol. 34, No. 12, May 1992, New York, NY, pp. 461–465.

SYSTEM AND METHOD FOR IMPLEMENTING A HIERARCHICAL POLICY FOR COMPUTER SYSTEM ADMINISTRATION

RELATED APPLICATION

The present application is a continuation of U.S. patent application Ser. No. 08/497,729 for SYSTEM AND METHOD FOR IMPLEMENTING A HIERARCHICAL POLICY FOR COMPUTER SYSTEM ADMINISTRATION, filed Jul. 3, 1995 and now abandoned.

BACKGROUND OF THE INVENTION

The present invention relates, in general to a system and method for implementing a hierarchical policy for computer system administration. More particularly, the present invention relates to a system and method for implementing a hierarchical policy for computer system administration which allows a less experienced system administrator to perform more difficult system administrative activities while concomitantly increasing his efficiency of operation.

M. S. Sloman and J. D. Moffet have published several papers on policy. See, for example: Sloman, M. S., Moffet, J. D. and Twiddle, K. P.: *"Domino Domains and Policies: An Introduction to the Project Results"* Domino Paper Arch/IC/4 20 Feb. 1992. Dept. of Computing, Imperial College, University of London; Moffet, J. D. and Sloman, M. S.: *"Representation of Policies as System Objects"* November 1991, SIGOIS Bulletin Vol 12, nos 2 & 3, pp 171–184; and Moffet, J. D. and Sloman, M. S.: *"Policy Conflict Analysis in Distributed System Management"*, 12 Apr. 1993, scheduled to appear in the Journal of Organizational Computing. In the first listed paper, the authors introduce the concept of "domains" which associate a set of managed objects with a common set of policies.

Messrs. Sloman and Moffet also describe policy hierarchies. However, the hierarchies discussed are merely based on the refinement of high level general policies. For example, a high level policy may be: "Protection from Loss" which may be refined to "Backup weekly." This approach is extremely limited and differs fundamentally from the concepts disclosed in the present invention hereinafter. Moreover, Sloman and Moffet do not discuss how "mix-ins" of policies may be applied to managed objects and they do not discuss the use of templates.

X/Open also includes policy as one of the services provided in their framework for systems management. See, for example: X/Open, *"Systems Management: Management Services for an OMG Environment (Draft 0.5)"*, Dec. 19, 1994. The approach therein proposed utilizes the concept of policy regions, which, while superficially bearing on the policy groups disclosed in the present invention, does not specify any inheritance semantics for hierarchies of such policy regions and only allows a managed object to be a member of a single policy region. Moreover, X/Open does not allow multiple templates for the same object type in a given policy region. In brief, the X/Open approach does not support the inheritance, template and membership semantics necessary to adequately implement a satisfactory hierarchical policy for computer system administration.

SUMMARY OF THE INVENTION

The system and method of the present invention advantageously overcomes the deficiencies of such previous approaches and supports "mix-ins", inheritance, template and membership semantics through use of a policy model which allows a relatively junior system administrator to perform the more difficult computer system administration tasks of a senior system administrator. In so doing, the cost of system ownership is lowered by reducing the amount of expertise required to manage an organization's computer systems thereby allowing for the reduction of the number of senior system administrators required in its operation.

As disclosed herein, policy has two basic services which are used to effectuate this improvement. a) services for the standardization of computer system configuration; and services to reduce/limit damage of non-malicious misuse of the computer system.

In the system and method herein disclosed, "Policy" is specified in terms of: 1) managed objects and 2) managed object attributes. Managed objects are abstractions of resources which are manipulated by system administrators. All managed objects are instantiations of a managed object class. A managed object type (or class) describes a group of objects with similar properties (attributes), common behavior (operations), common relationships to other managed objects and common semantics. Types (or Classes) of managed object include, for example: users, hosts and printers. An example of a managed object would be a particular computer user: "User".

On the other hand, managed object attributes are the characteristics (or properties) of a managed object. Management applications manipulate a managed object's attributes in order to administer a managed object. Examples of possible attributes for a managed object of the type: "User" include: user name, user id ("UID"), group id ("GID"), password, home directory and mail spool location.

System administrators cannot generally define types of managed objects or their associated attributes, as new types of managed object must generally be defined by the developers of the resources. However, system administrators can create and delete managed objects of defined managed object types and can manipulate the attributes of the managed objects they create.

With respect to policy services, it is disclosed herein that a managed object may be composed of attributes, and policies can be specified for each of the managed object attributes. For example, a managed object of class X may have attributes: A, B and C. Each of these attributes can have a policy. A specific example of a policy is that the length of the password attribute of a user object must be greater than six characters. Thus, utilizing the system and method disclosed herein, the senior administrator defines policy by specifying expressions that describe constraints for the attributes of a class of managed object.

Many system administration organizations have a hierarchical definition of policies. For example, there can be corporate, division and group policies. Each of these policies has a scope of influence. For example, the corporate policy must be followed throughout the enterprise, the division policy must be followed throughout the division and so on. This characteristic produces a nesting of policies: a managed object in a given division must follow the division and corporate policies. Therefore, the policy services must support a nesting of policies.

This system and method of the present invention herein disclosed also allows policies to be specified in a hierarchical manner. Policies are associated with policy groups and policy groups can be arranged in a hierarchical manner. A policy group may also have a set of managed objects associated with it and the managed objects associated with a given policy group must follow the policies associated with the policy group.

BRIEF DESCRIPTION OF THE DRAWINGS

The foregoing and other features and objects of the present invention and the manner of attaining them will become more apparent and the invention itself will be best understood by reference to the following description of a preferred embodiment, taken in conjunction with the accompanying drawings, wherein.

DESCRIPTION OF A PREFERRED EMBODIMENT

Figure 1A:
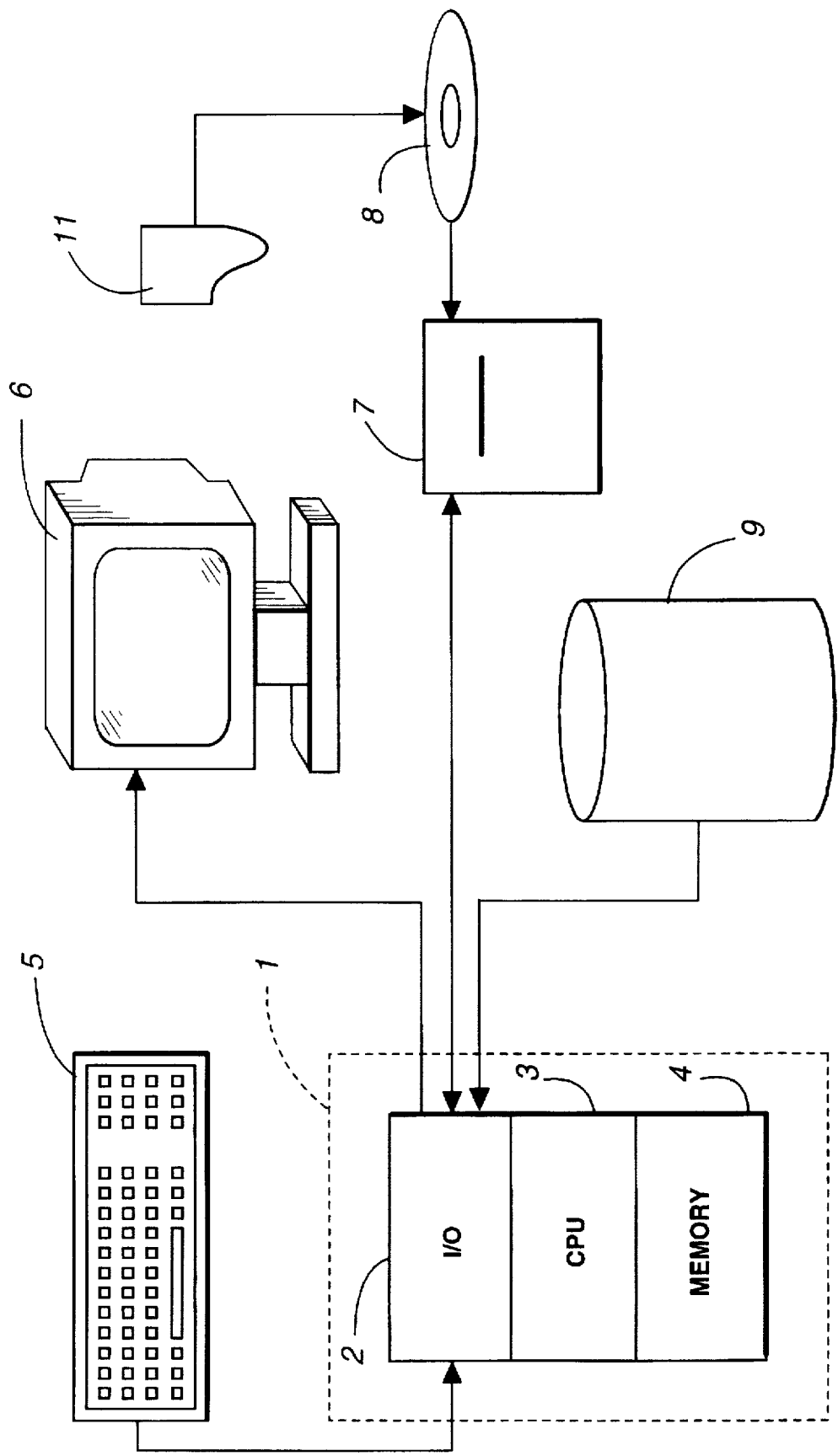
FIG. 1A is a simplified representation of a general purpose workstation computer forming a portion of the operating environment in which the present invention is used.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1A, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 11 and data. The computer program products containing mechanisms to effectuate the apparatus and methods of the present invention may reside in the memory section 4, or on a disk storage unit 9 or on the CDROM 8 of such a system.

Figure 1B:
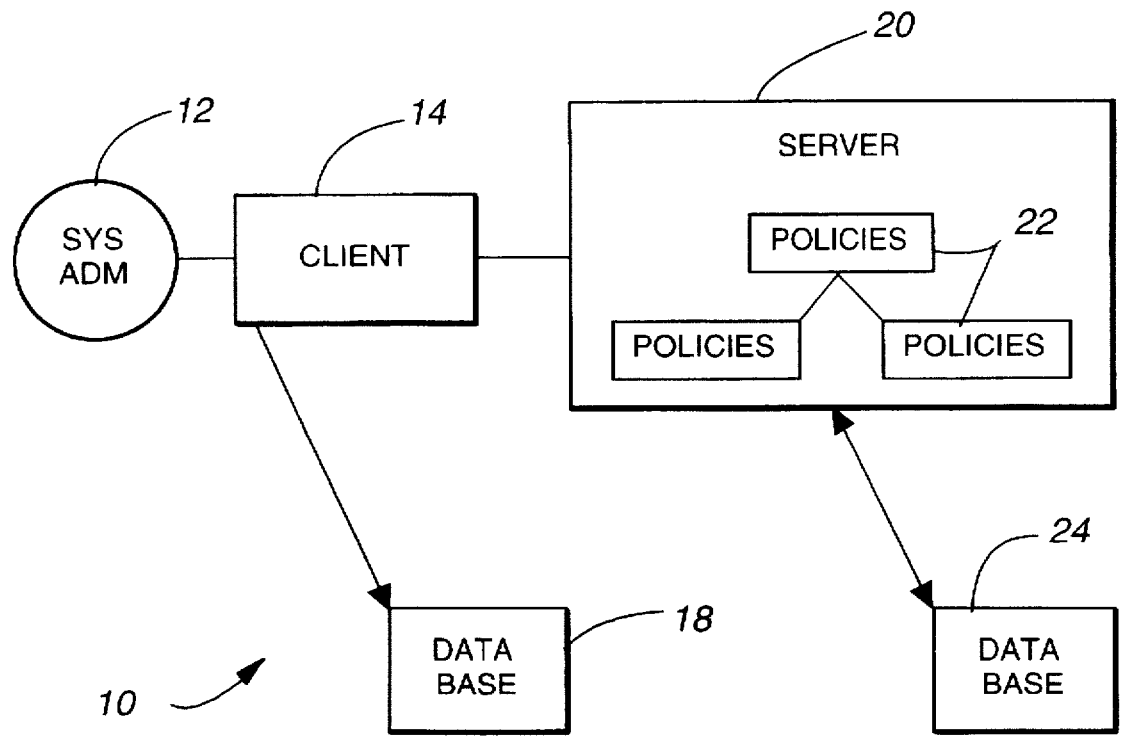
FIGS. 1B and 1C illustrate the general architecture of one possible implementation of the system and method for implementing a hierarchical policy for system administration of the present invention utilizing a client-server configuration illustrating, respectively, the use of the system by a relatively junior system administrator (for example, to change a user password) and the management of the system by a more experienced system administrator to possibly alter policies by adding, deleting or modifying the interrelationship between policies in a policy hierarchy.
Figure 1C:
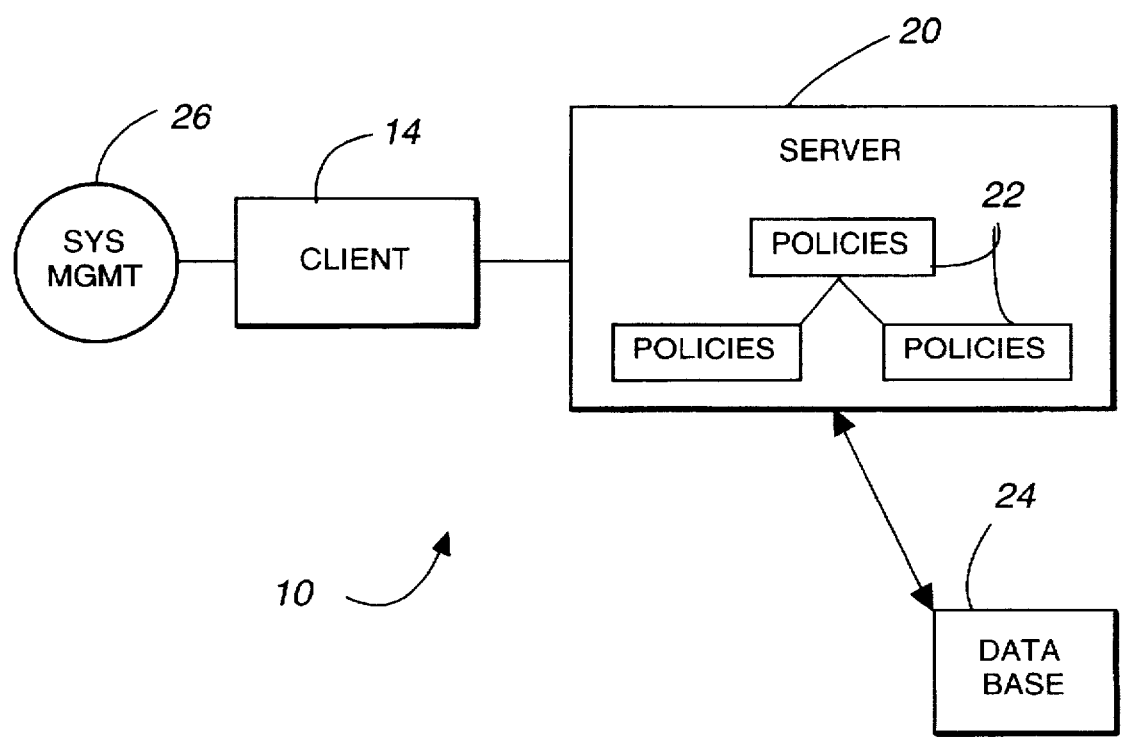

With reference now to FIGS. 1B and 1C, the general architecture of one possible implementation of a computer system 10 utilizing the system and method for implementing a hierarchical policy for system administration of the present invention is shown utilizing, for example, a client-server configuration.

The use of the computer system 10 by a junior system administrator 12 is shown in FIG. 1B wherein the system administrator 12 accesses the client computer 14 through a user interface (not shown). The client computer 14 has a directly associated database 18. The client computer 14 is also coupled to a server computer 20 having a predetermined policy group comprising a number of policies 22 associated therewith as will be more fully described hereinafter. The server computer 20 also has an associated database 24 which may reside on an internal or external computer mass storage subsystem. In the client-server model illustrated, most of the policies 22 may reside in the server computer 20 database 24 although it is also possible that they may be resident elsewhere in the computer system 10.

On the other hand, the management of the computer system 10 is shown in FIG. 1C wherein a senior system administrator is illustrated as a system management function 26 accessing a client computer 14 through a user interface (not shown) for initially establishing the various policies 22 of a policy group for the server computer 20 which may be retained within an associated database 24. The system management function 26 allows the senior system administrator to change the hierarchies among various policies 22 and to add, delete or modify the policies 22 within a particular hierarchy. The management of the computer system 10 shown in FIG. 1C is, in a sense, recursive with the use illustrated in FIG. 1B inasmuch as use of the computer system 10 is also a management of it.

In the particular example illustrated, if the system administrator 12 needs to modify the attributes of a particular user, for example, the user's password, the client computer 14 is accessed directly through the user interface as shown in FIG. 1B. The client computer 14 then makes a request of the server computer 20, which then runs through the policies 22 maintained in its database 24 to determine which ones apply to the specific request. The polices 22 that are thereafter returned to the client computer 14 are the ones that the senior system administrator has previously and independently determined were relevant to the particular request and were input to the server computer 20 database 24 as shown in FIG. 1C. The policies 22 returned to the client computer 14 as relevant to the request are then stored in the database 18 and evaluated. If the password change proposed by the junior systems administrator 12 passes all of the policies 22 returned from the server computer 20, the change may then be made.

Figure 2:
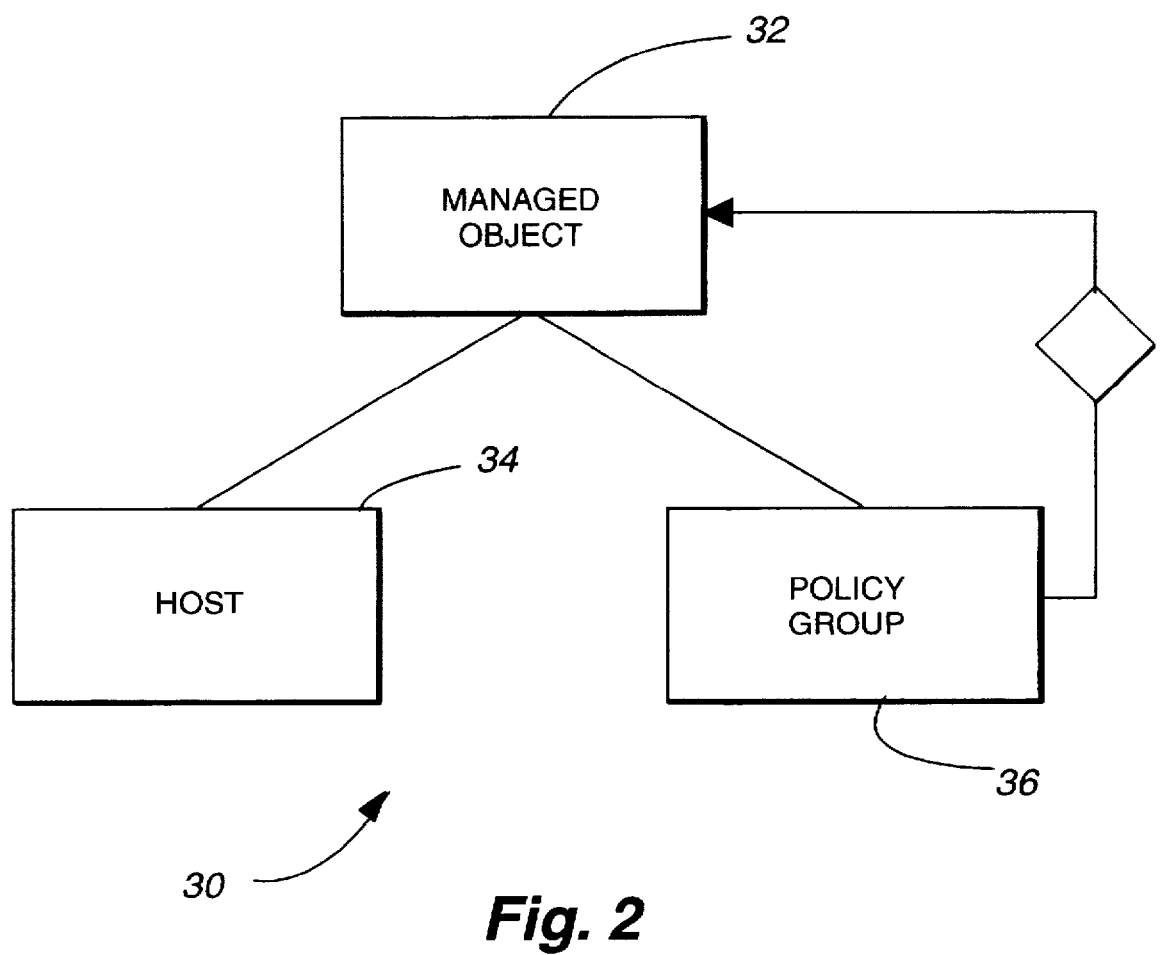
FIG. 2 is a representative class diagram illustrating the inheritance and containment in a possible class hierarchy for a managed object which may include, for example, a host computer or a policy group which contains managed objects and wherein a policy group has children which are managed objects and a managed object has parents which are policy groups.

With reference now to FIG. 2, a representative class diagram 30 illustrating the inheritance in a possible class hierarchy for a managed object which may include, for example, a host computer 34 or a policy group 36 which contains the managed objects 32. As depicted, a policy group 36 has children which are managed objects 32. A managed object 32 has parents which are policy groups 36. As will be described more fully hereinafter with respect to representative pseudocode for implementing the system and method of the present invention and the corresponding flowcharts of FIGS. 11A–B, 12A–B and 13, there is an interrelationship between managed objects 32 and policy groups 36 utilizing object oriented ("OO") programming concepts.

Utilizing OO concepts, a number of classes may be defined which may, in turn, relate to types of objects. These classes are then refined into subclasses of classes. As an example, a class could comprise "persons" (a managed object 32) with subclasses of "persons" being "employees" (a policy group 36). An "address" may be associated with the class of "persons" while "salary" may be associated with "employees". Utilizing a step-wise refinement, "employees" (a policy group 36) inherit all the characteristics of "persons" (a managed object 32) inclusive of names, addresses and the like. Stated another way, a managed object 32 can have subclasses such as host 34 and policy group 36 and a policy group 36 can have superclasses such as managed object 32.

Figure 3:
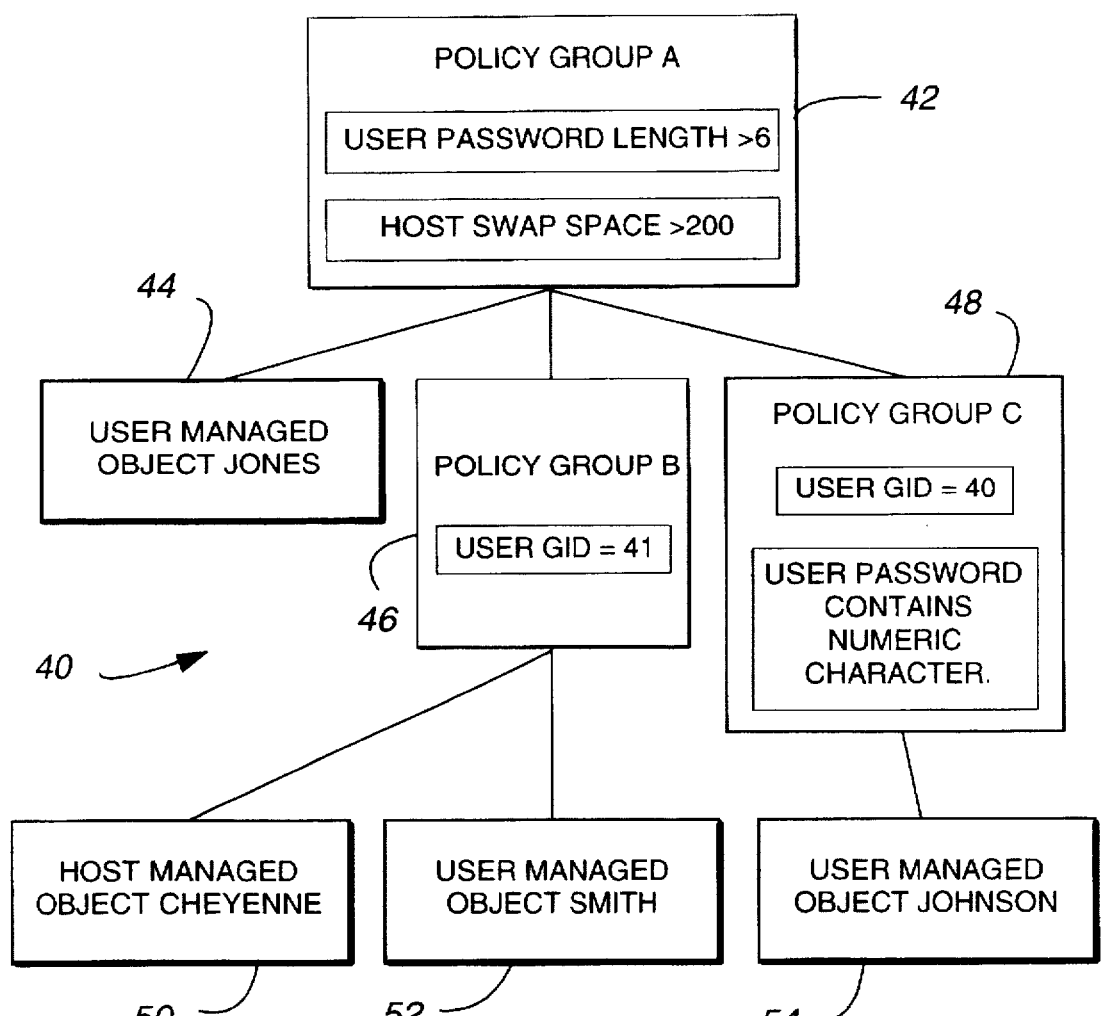
FIG. 3 is a simplified block diagram of a policy relationship having three policy groups: A, B and C, each having various policies forming a part thereof.

With reference now to FIG. 3, an exemplary policy arrangement 40 in accordance with the present invention is shown. Policy arrangement 40 illustrates three policy groups: Policy Group A 42, Policy Group B 46 and Policy Group C 48. As has been previously mentioned, a policy is defined by a managed object type and an attribute. In Policy Group A 42 there are two policies. The first policy is for the password attribute of the User type. This policy states that the length of the password attribute must be greater than six characters. This implies that the user managed object Jones 44, which is a member of Policy Group A 42, must have a password which is greater than 6 characters. The second policy is for the swap space attribute of a host type managed object. This second policy states that the value of the swap space attribute must be greater than 200.

It is also important to note that a given policy group can contain policies for multiple types of managed objects. In the example of FIG. 3, Policy Group A 42 is seen to contain a policy for hosts as well as for users.

Policy Group B 46 and Policy Group C 48 are "children" of Policy Group A. This means that Policy Groups B and C 46,48 must follow the policies in Policy Group A 42 in addition to their locally defined policies. Therefore, user type managed objects (such as user managed object Smith 52) which are members of Policy Group B 46 must follow the user password length policy defined in Policy Group A 42 and the locally defined policy for the GID attribute of the user type (wherein GID must equal 41). In addition, the host managed object Cheyenne 50 must also follow the host policies inherited from Policy Group A 42. That is, the value of Cheyenne 50's swap space attribute must be greater than 200.

Policy Group C 48 has a policy defined for the same managed object type and attribute as one of its parents (e.g. user password). In this situation, a user managed object such as user managed object Johnson 54, which is a member of Policy Group C 48, must satisfy the parent's (Policy Group A 42) policies for user password as well as its local policies for user password. Thus the password attribute for a user managed object Johnson 54 which is a member of policy group C 48 must have password length which is greater than six characters (per Policy Group A 42) and the password must contain a numeric character (per Policy Group 48). It should be noted that while it is possible to create contradictory policies in the parents and children which are impossible to satisfy, the assumption is made that the determination of policy conflicts and the correction of these conflicts will be performed by the senior system administrators.

Figure 4:
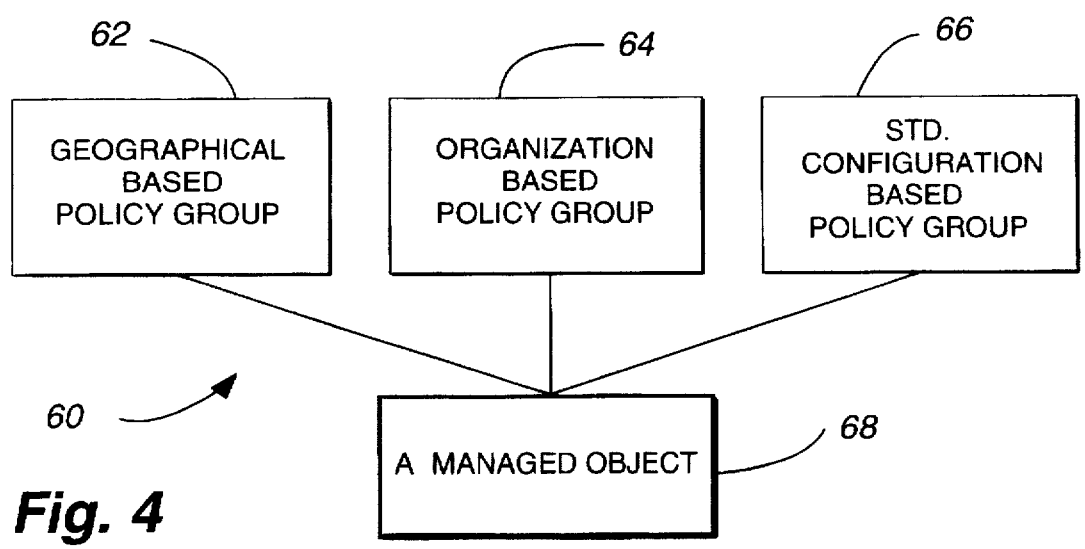
FIG. 4 is a simplified block diagram of a representative mix-in of policy groups having the same managed object as a member.

With reference now to FIG. 4 an example of a policy mix-in 60 is shown. By way of background, there are a number of "types" of policies that system administrators may define. As an example, a system administrator may define rules for performance optimization. These rules could be based on the physical location relationships among managed objects (a geographical basis) or these rules could be based on the particular implementation of a particular resource. A specific example may be insuring that the system that maintains the mail spool for a given user resides on the same LAN that connects the user's office to the network.

A system administrator may also define rules to help insure the security or the accountability of a resource and these rules may be based, for example, on a given managed object's relationships among enterprise organizations (an organizational basis). Specific examples may include assigning the same GID to all members of a given organization or project or to ensure that the same rules for password selection are followed by all members of a given group of users (e.g. the length of the password must be greater than 6 characters).

A system administrator may further define rules to insure the standardization of the system configuration (a standardization of configuration basis). Many times these rules are based on the type and the particular use of a given resource. Examples include defining a common pattern for the location of the mail file (e.g. /var/mail/<username>).

As is apparent from the foregoing examples, a given managed object 68 may have some attributes governed by performance considerations, some attributes governed by security considerations and some attributes governed by configuration standardization considerations. Moreover, given the wide range of considerations or types of policies, it is very unlikely that the system administrator would want to combine these types of policies into a single hierarchy and the system administrator may want to define specialized hierarchies for different policy types.

Separate hierarchies based on the "type" of policy allow a policy mix-in 60 approach to the assignment of policy to a particular managed object 68. A system administrator can, therefore, associate a given managed object with the specialized policy regions that provide the desired policies. Thus, as shown in FIG. 4, a given user managed object 68 could be a member of a policy region which specializes in security policies (such as an organizational based policy group 64), a member of a policy region which specializes in performance (such as a geographical based policy group 62) and a member of a policy region that supports standardization of configuration (such as standard configuration based policy group 66).

Figure 5:
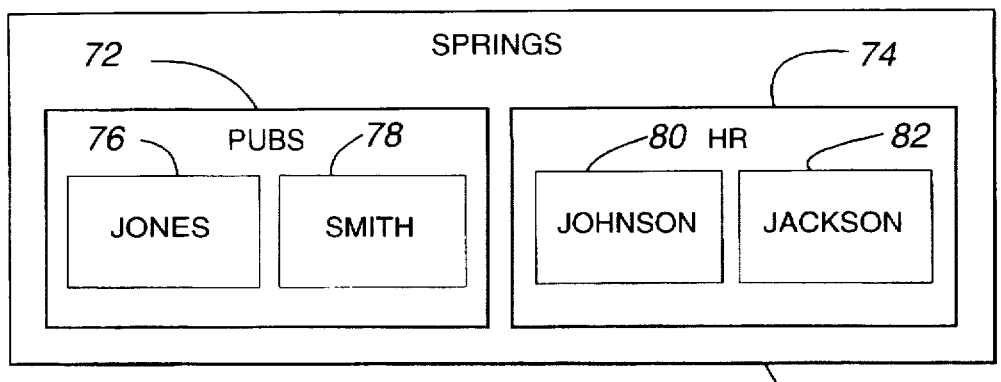
FIG. 5 is a simplified block diagram of a possible basic environment for the system and method of the present invention wherein a representative portion of the organization previously illustrated is divided into functional subgroups: Publications ("PUBs") and Human Relations ("HR")
Figure 6:
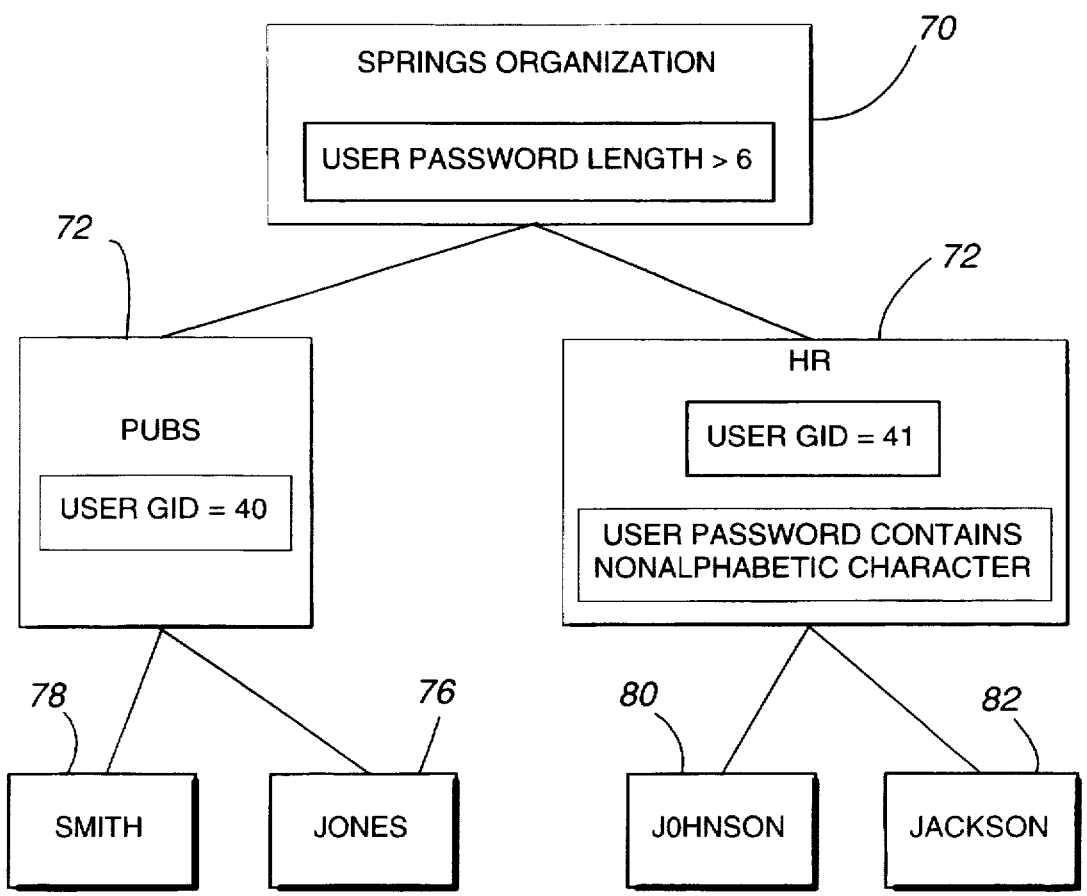
FIG. 6 is a further diagram of the environment of FIG. 5 illustrative of certain policies associated with the PUBs and HR organizational functions respectively.
Figure 7:
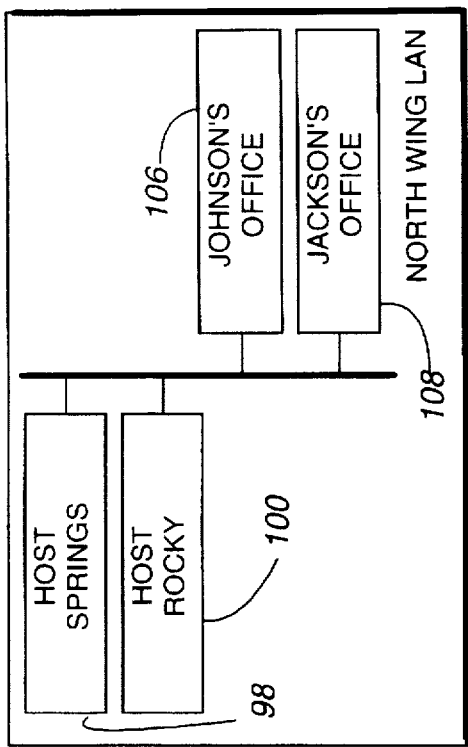
FIG. 7 is a further simplified diagram of the hypothetical physical layout of the Springs site associated with the preceding figures showing a representative breakdown of the various local area networks ("LANs") in use.

With reference to FIGS. 5, 6 and 7 and the following text, the concept of policies and policy groups may be better understood. In this exemplary illustration, the assumption is made that the user type of managed object (Jones 76, Smith 78, Johnson 80 and Jackson 82) might have the following attributes: name, UID, GID, password, mail spooler and home directory. The basic conditions and environment for the illustration are that the user managed objects are part of one organization which is managed by a given set of administrators, that is Springs organization 70.

The Springs organization 70 is physically split on two local area networks: South Wing LAN 90 and North Wing LAN 92 and is also further divided into suborganizations based on function: the HR group 74 and PUBs group 72. The PUBs group 72 has users: Jones 76 and Smith 78 while the HR group 74 has users Johnson 80 and Jackson 82. Offices served by the North Wing LAN 92 include Johnson's office 106 and Jackson's office 108. Offices served by the South Wing LAN 90 include Jones' office 102 and Smith's office 104.

In the example illustrated, the following are assumed to be policies of the Springs organization 70:

1) The location of the mail spooler and home directory must be local to the LAN at which the user's office resides.
   a) as to the North Wing LAN 92:
      i. the mail spooler for users whose offices are serviced by this LAN 92 must be the host Springs 98; and
      ii. the home directory for users whose offices are serviced by this LAN 92 must be on hosts Rocky 100 or Springs 98.
   b) as to the South Wing LAN 90:
      i. the mail spooler for users whose offices are serviced by this LAN 90 must be the host Mastermind 94; and
      ii. the home directory for users whose offices are serviced by this LAN 90 must be on hosts Mastermind 94 or Cheyenne 96.

2) All Users in the Springs organization 70 must have a password which is greater than 6 characters in length.

3) Each of the subgroups of the Springs organization 70 must have a different GID and each member of a subgroup must have the same GID.

4) All users in the HR group 74 in addition to having a password greater than 6 characters in length must also have a non-alphabetic character in their password.

The following sets of policies and policy groups satisfy the foregoing constraints:

1. Springs Organization 70 Policy Group
   a. Policies: User Password length>6 characters
   b. Members: PUBs Policy Group 72, HR Policy Group 74
2. PUBs Policy Group 72
   a. Policies: User GID=40
   b. Members: Smith 78, Jones 76
3. HR Policy Group 74
   a. Policies: User GID=41, User password must contain a non-numeric character
   b. Members: Johnson 80, Jackson 82
4. North Wing LAN 92 Policy Group
   a. Policies: User mail spooler=Springs 98, user home directory must be either Rocky 100 or Springs 98.
   b. Members: Jackson's office 108, Johnson's office 106.
5. South Wing LAN 90 Policy Group
   a. Policies: User mail spooler=Mastermind 94, user home directory must be either Mastermind 94 or Cheyenne 96.
   b. Members: Jones' office 102, Smith's office 104

As noted previously, policy groups can be nested. That is, a policy group can contain other policy groups. With specific reference to FIG. 6, a policy group which is contained by other policy groups inherits the policies defined by the containing groups. In the example above, the members of HR and PUBs policy groups 74, 72 inherit the policies from the Springs organization 70 policy group (User password length>6). In addition, the members of the HR group 74 must satisfy another constraint regarding user password, wherein it must include at least one non-alphabetic character. Finally, members of the HR group 74 must also have a GID of 41 and the members of the PUBs group 72 must have a GID of 40.

Figure 8:
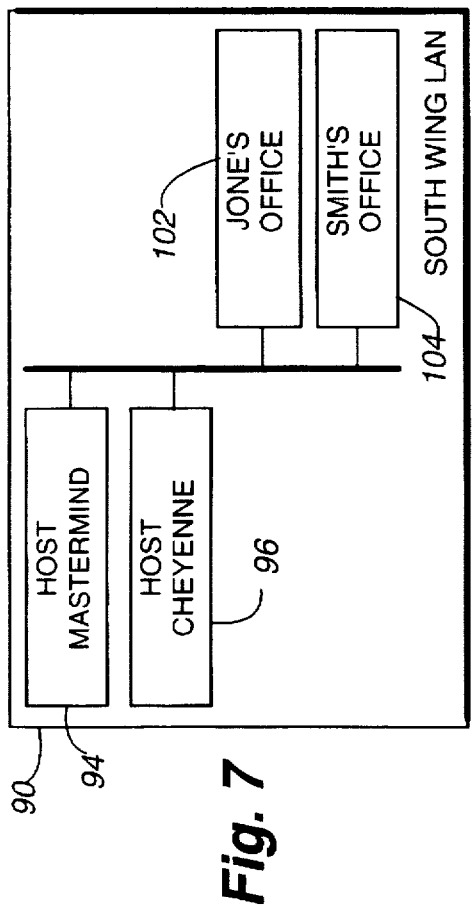
FIG. 8 is a follow-on diagram illustrating the Springs site geography, the physical layout of the LANs with their respective policies and the various managed objects previously illustrated.
Figure 8:
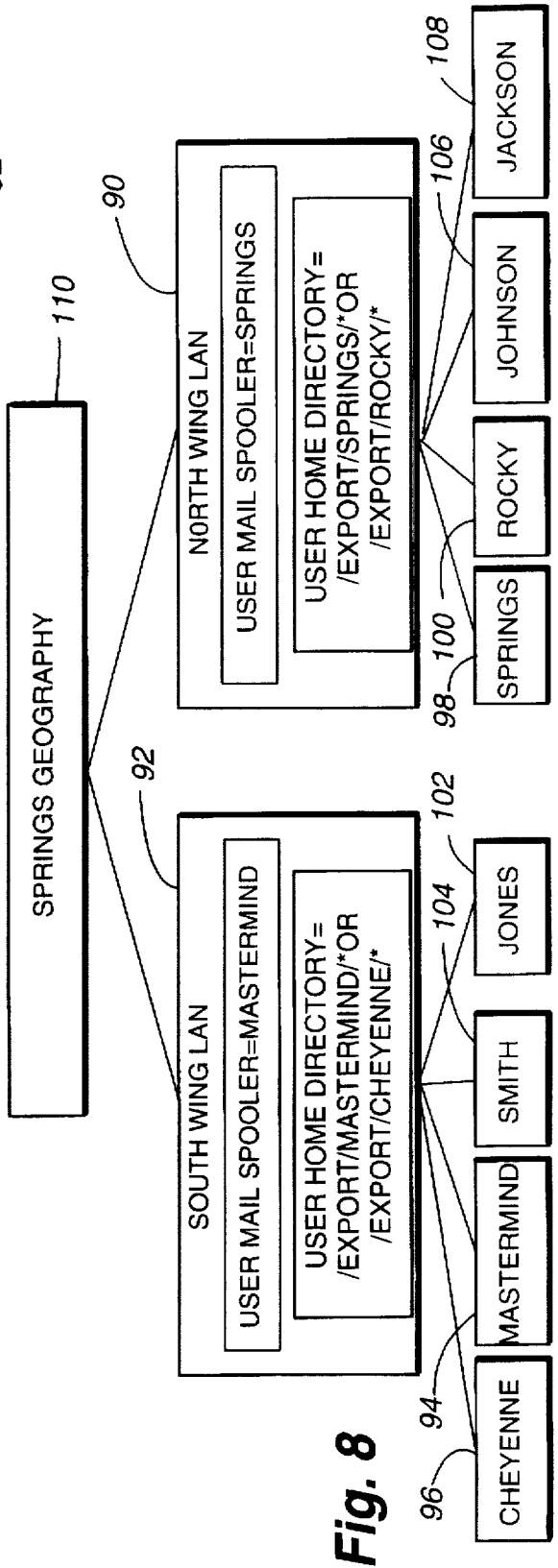

A managed object can be a member of multiple policy groups. In the above example, and with particular reference additionally to FIG. 8, the overall Springs Geography 110 is shown. As an example, the user Jackson 82 is a member of the HR group 74 (FIGS. 5 and 6) and the North Wing LAN 92 policy groups (FIG. 7). Thus the user Jackson 82 has the policies from the HR group 74 applied to it (User password length>6, User password must also include a non-alphabetic character, and User GID must equal 41) and the policies of the North Wing LAN 92 applied to it (user mail spooler= Springs 98, user home directory must be either Rocky 100 or Springs 98).

Figure 9:
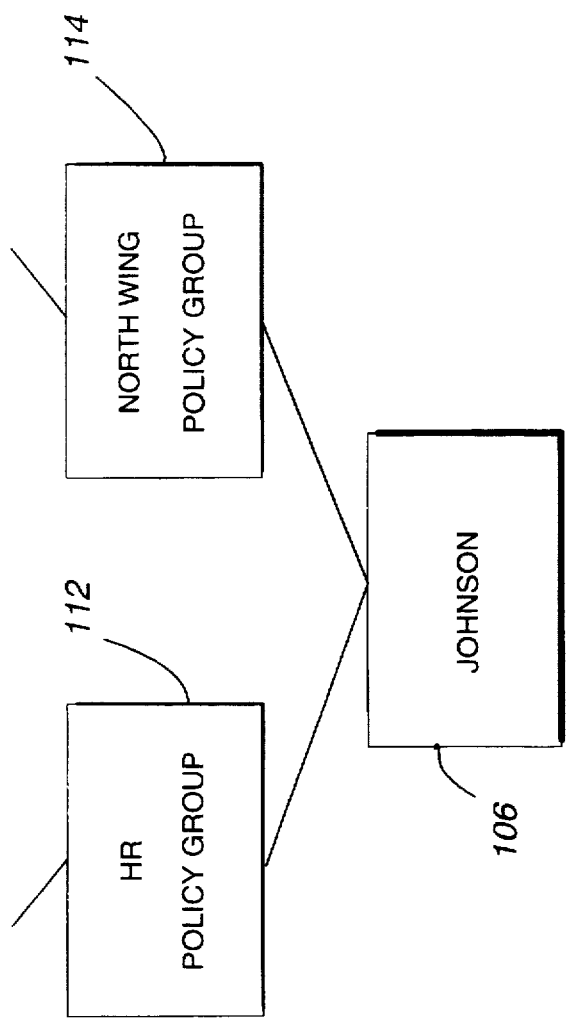
FIG. 9 is a specific example of a policy mix-in for the user: "Johnson" wherein he is a member of both the HR and South Wing LAN policy groups.

As shown in simplified format with respect to FIG. 9, the user Johnson 106 is a member of the HR policy group 112 as well as the North Wing LAN policy group 114. Similar illustrations demonstrating which policies apply to users Jones 76 and Smith 78 may be readily constructed to depict their membership in multiple policy groups and the policies of the respective policy groups.

The senior system administrator can have mandatory and advisory policies. A mandatory policy does not allow the proposed change to be made if it violates policy. On the other hand, an advisory policy would identify the policy violation and allow the object to be saved.

When an attribute of a managed object is to be modified, the proposed attribute value is checked to verify that the proposed value follows the policies in all of the policy groups of which the managed object is a member. If the proposed value does not follow policy then the proposed attribute modification is not allowed.

It should be noted that it is possible for a managed object in a given group not to follow the policies of the group if the policies of the group are changed after the managed object has previously become a member of the group. These members will not be removed from the policy group. These members will be flagged as not following policy.

In this regard, it is important to emphasize that applications which manipulate the attributes of a managed object should ideally be modified to call validation policy checking routines. Nevertheless, ensuring that managed objects can only be modified by applications that perform policy checking may not be completely feasible. As a consequence, other applications may need to be modified to periodically scan the managed objects and return the set of managed objects which do not follow policy.

Figure 10:
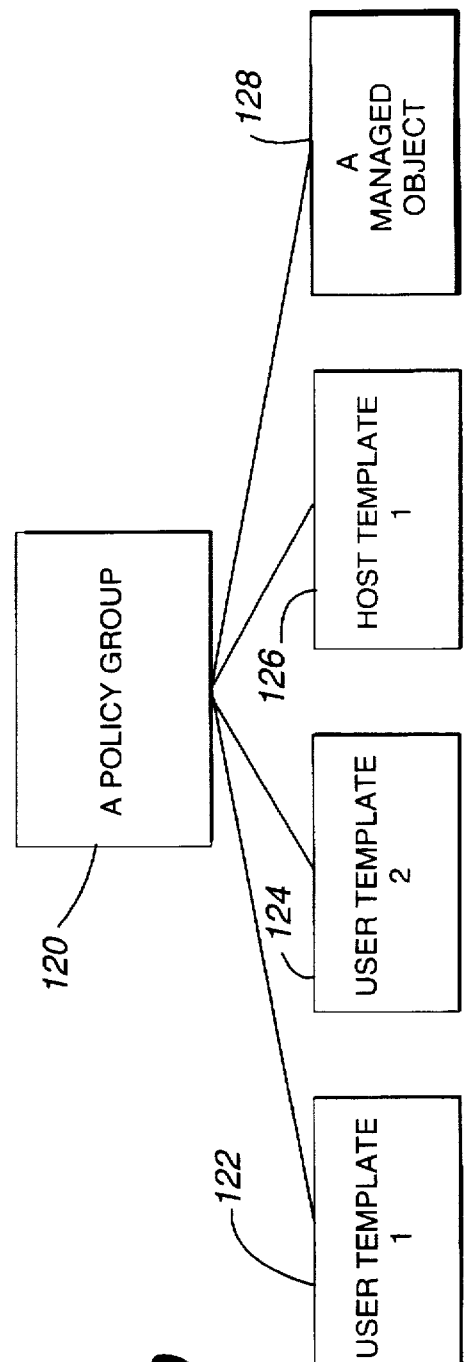
FIG. 10 is a simplified block diagram of a single policy group associated with a number of User and Host templates for a particular managed object.

With reference now to FIG. 10, a policy group 120 is shown in conjunction with a pair of user templates 122, 124, a host template 126 and a managed object 128. In accordance with the system and method of the present invention, both templates and clones may be used to provide initial values for attributes when a managed object 128 is created. Templates 122-126 are associated with policy groups and the values for the attributes specified in the template must follow the policies associated with the policy group 120. As shown, the policy group 120 can be associated with multiple templates 122-126 for the same type of managed object 128. A policy group can also be associated with multiple templates for different types of managed objects (e.g. user templates 122, 124 and host template 126). Not all of the attributes of a template need to have values specified.

In accordance with the present invention, templates can also be used to simplify the policy group hierarchy for the junior system administrator. Templates can be used in a manner akin to book marks to indicate to the junior system administrator which policy groups he can create in new instances. This functionality should be closely integrated with the user interface technology of the computer system 10 (FIGS. 1B and 1C).

The system and method of the present invention also supports the cloning of managed objects. A clone has all of the same attribute values of the master except for the attributes used to identify the instance of the object. In addition, the clone is a member of all of the same policy groups as the master. The master must be a managed object that follows all of the policies associated with its memberships.

Using the example above with reference to the preceding figures, and assuming the system administrator wants to create a new HR group 74 user which also has an office that is serviced by the North Wing LAN 92, then the system administrator might, for example, clone the user Jackson 82. The clone would be a member of the HR policy group 74 and the North Wing LAN 92 policy group.

Cloning and the use of templates saves the system administrator time because not all system administrators need to learn the semantics and determine the appropriate values of each attribute. In this regard, a senior system administrator can define the "master" or template, for use by the junior system administrators. Moreover, the system administrator does not need to manually enter the values for any of the attributes and he can merely accept the values of the clone or template. This results in the system administrator becoming more efficient and less prone to entry errors. Finally, the disciplined use of clones and templates can go a long way toward ensuring the standardization of managed object configurations.

Figure 11A:
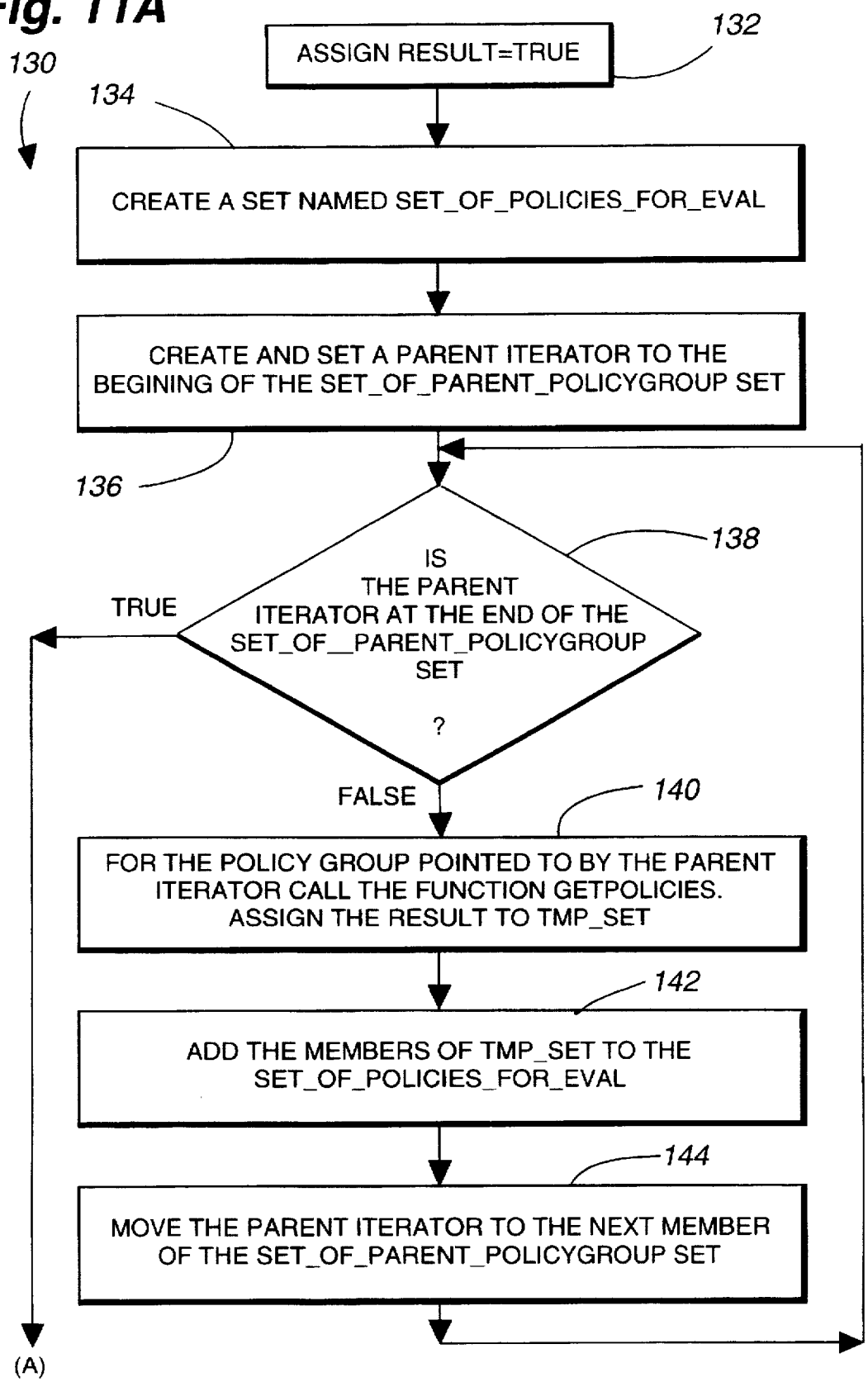
FIGS. 11A and 11B are a representative flow chart for the implementation of the hierarchical policy for system administration disclosed for the function: ManagedObject::ValidateProposedValue(AttributeName, AttributeValue)
Figure 11B:
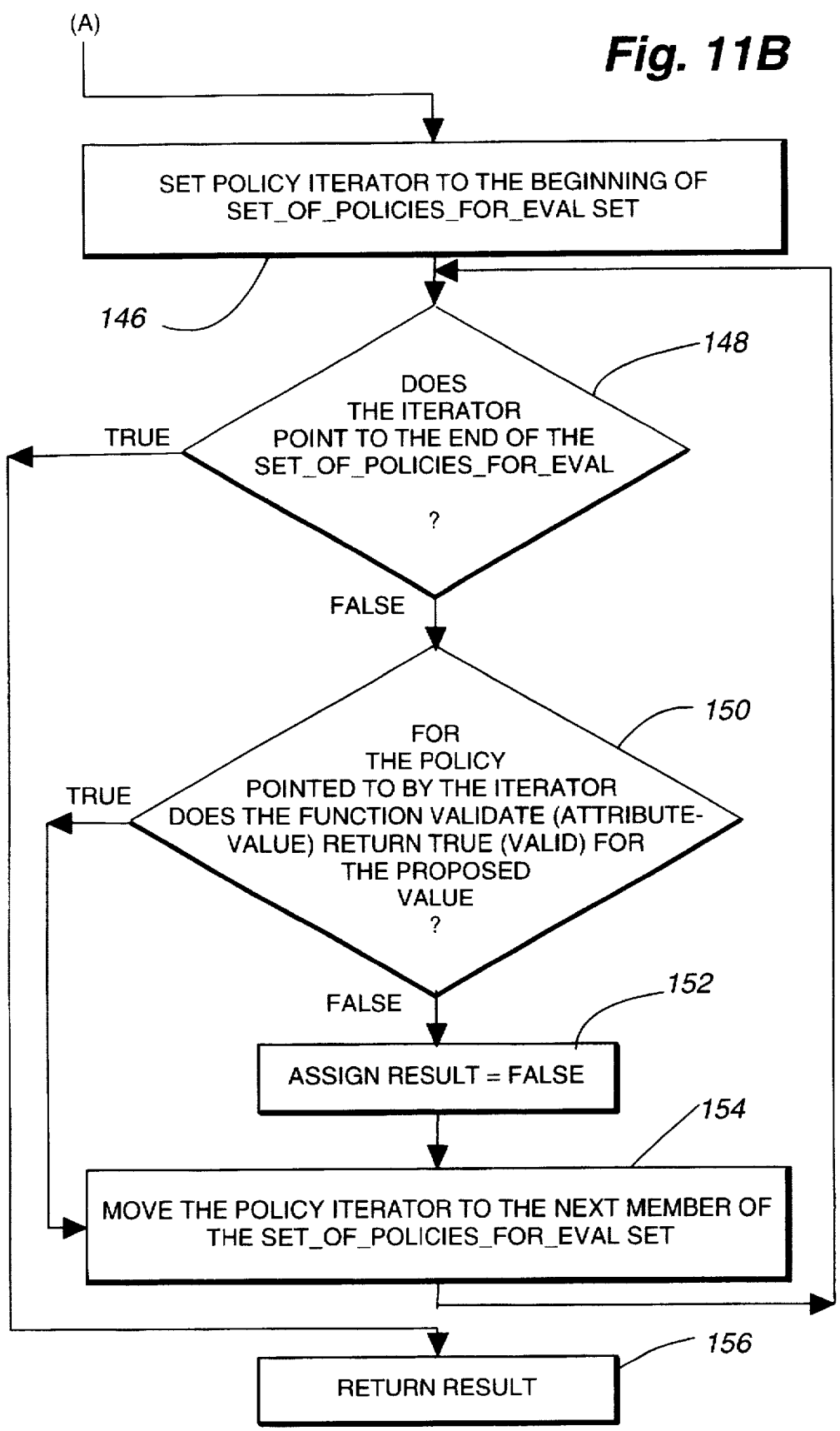

With reference additionally now to FIGS. 11A and 11B a representative flowchart for implementing the function of determining whether or not a proposed attribute for a managed object follows policy is shown in conjunction with the following pseudocode of Block 1 for implementing the process. The pseudocode provided hereinafter parallels that of known OO programming languages such as C++ and Smalltalk™ for ease of understanding.

The process 130 begins at step 132 to assign result=true and then, at step 134 a set named set_of_policies_for_eval is created. Step 136 then follows in which a parent iterator is created and set to the beginning of the set_of_parent_PolicyGroup set.

At decision step 138, if the parent iterator is not at the end of the set_of_parent_PolicyGroup set, at step 140, the policy group pointed to by the parent iterator calls the function getPolicies and assigns the result to tmp_set. At steps 142 and 144 the members of the tmp_set are added to the set_of_policies_for_eval and the parent iterator is moved to the next member of the set_of_parent_PolicyGroup set. On the other hand, if at decision step 138, the parent iterator is now at the end of the set_of_parent_PolicyGroup set, at step 140, the process 130 proceeds to step 146 to set the policy iterator to the beginning of the set_of_policies_for_eval set.

At decision step 148, the iterator is evaluated to determine whether or not it points to the end of the set_of_policies_for_eval. If true, the process proceeds to step 156 to return the result. If false, the process proceeds to decision step 150 to determine whether the policy pointed to by the iterator validates (AttributeValue), or returns true (valid), for the proposed value. If false, the process proceeds to step 152 to assign result=false and then to step 154 to move the policy iterator to the next member of the set_of_policies_for_eval set, then back to decision step 148. If true, step 152 is bypassed directly to step 154 for return to decision step 148.

Fundamentally, the program process 130 instructs the server computer 20 (FIG. 1B) to retrieve all policies of the parents of the managed object from its database 24 which relate to a particular attribute of the managed object. The policies returned are then evaluated with regard to the proposed value and, if the value fails any of the policies, the proposed value for the attribute fails. To determine which policies of the various parents to return, the system relies on the policy group to determine who the parents of the managed object are and whether or not they have any policies which relate to the proposed attribute value (i.e. user passwords). In effect, a recursive search of the tree of policy groups is undertaken by the server computer 20 and its associated database 24 as previously input by the senior system administrator (FIG. 1C).

```
Block 1:
                    Class ManagedObject class ManagedObject
        /* Attributes */
        name;
        set_of_parent_PolicyGroups;
        /* functions */
        validateProposedValue (AttributeName,Attrib
        uteValue):
            return (boolean);
        polymorphic class_of_self ():
            returns  (the name of the class of the
                caller);
end class ManagedObject
/* function definitions for ManagedObject */
validateProposedValue (AttributeName,AttributeValue)
        create empty set_of_policies_for_eval;
        passedPolicy = TRUE;
        for each parent in set_of_parent_PolicyGroups do
            set_of_policies =
                    Parent.getPolicies (class _ of _
            self() ,AttributeName);
            add set of policies to
    set_of_policies_for_eval;
        end for loop;
        for each policy in set _ of _ policies_for_eval
        do
            if  (policy.validate(AttributeValue)  ==
                FALSE) then
                passedPolicy=FALSE;
            end if;
        end for loop;
        return passedPolicy;
end function validateProposedValue;
```

Figure 12A:
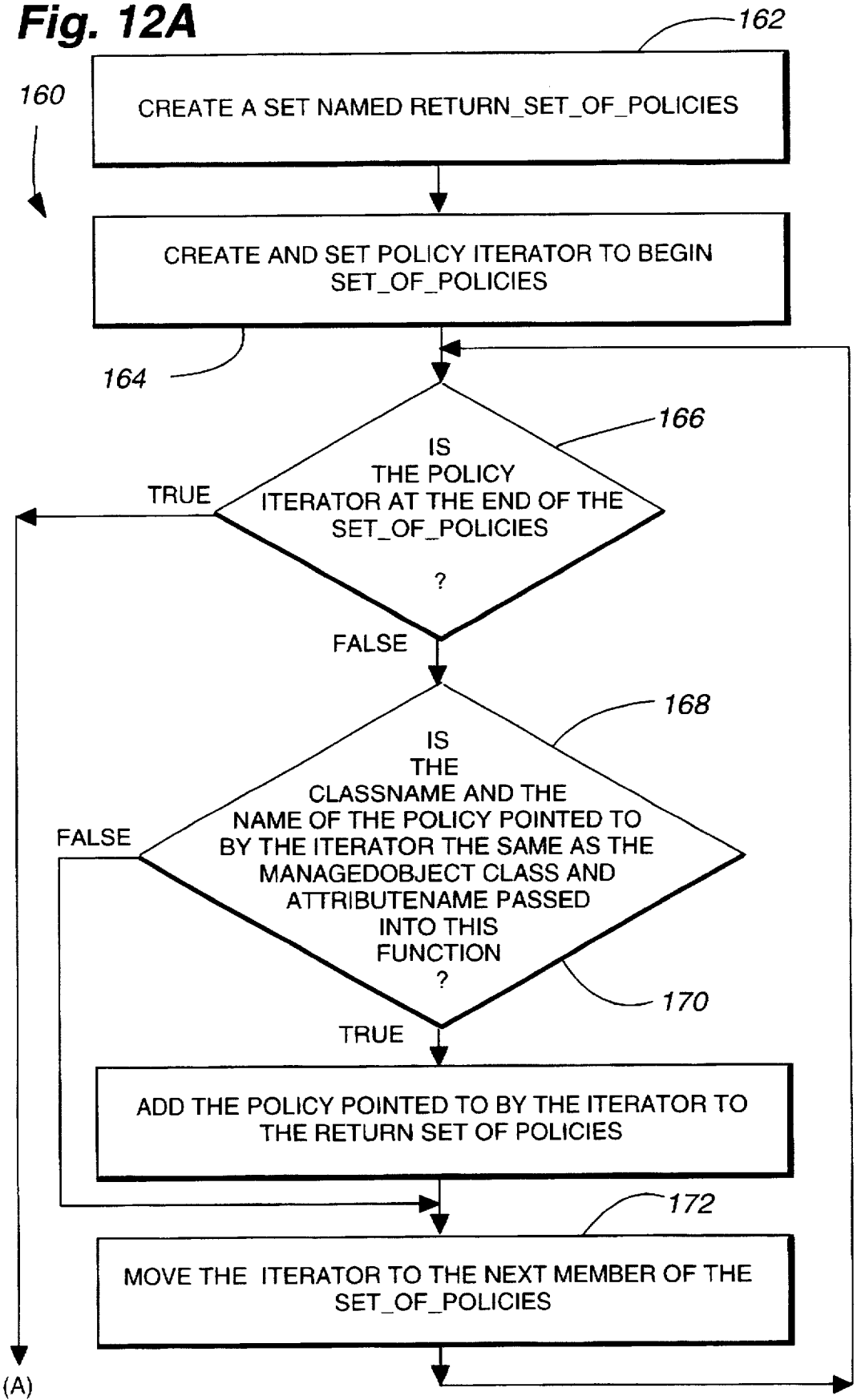
FIGS. 12A and 12B are a representative flow chart for the implementation of the function: PolicyGroup::GetPolicies (ManagedObjectClass, AttributeName)
Figure 12B:
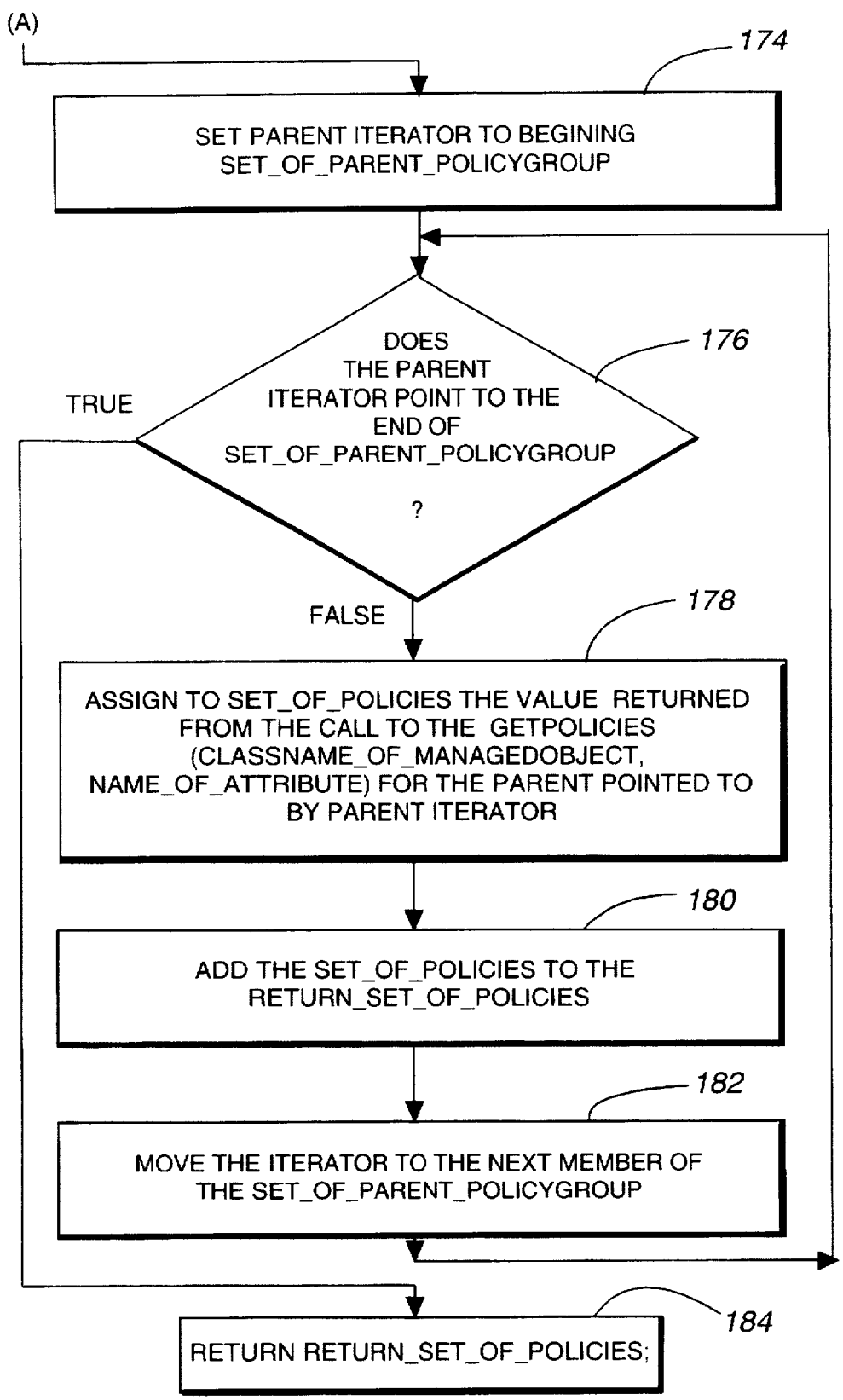

With reference additionally now to FIGS. 12A–12B a representative process flow 160 is shown to enable the retrieval of the applicable policies given the class name of the managed object and the name of the managed object attribute (i.e. password). The process flow 160 illustrated parallels the pseudocode of Block 2 following.

At step 162 a set named return_set_of_policies is created and a policy iterator is created and set to begin set_of_polices at step 164. At decision step 166 the policy iterator is tested to determine if it is at the end of the set_of_policies. If true, the parent iterator is set to the beginning of the set_of_parent_PolicyGroup at step 174. If false, the className and the name of the policy pointed to by the iterator is tested at decision step 168 to determine if it is the same as the ManagedObject class and the attributeName is passed into this function.

If true, the policy pointed to by the iterator is added to the return_set_of_policies at step 170 and the iterator is moved to the next member of the set_of_policies at step 172. If false, step 170 is bypassed and the process 160 proceeds to step 172 and then returns to decision step 166.

Following step 174, decision step 176 determines whether the parent iterator points to the end of set_of_parent_PolicyGroup. If true, the process 160 then proceeds directly to step 184 to return return_set_of_policies. If false, the value returned from the call to the getPolicies (className_of_MandagedObject, name_of_attribute) for the parent pointed to by the parent iterator is assigned to set_of_policies at step 178. Thereafter at step 180, the set_of_policies is added to the return_set_of_policies and the iterator is moved to the next member of the set_of_patent_PolicyGroup at step 182. The process 160 then returns to decision step 176.

In operation, a search is first done on all locally defined policies, that is, policies that are local to the policy group. They are analyzed to determine whether there is a match on class name and attribute name. If a match is found, the policy is placed in the set that will be returned. After the local search, the parents are queried as to policies for the particular class and attribute and the policies returned are also added to the set to be returned. The completed set is then returned and that is passed down to the managed object making the request where the evaluation as to policy compliance takes place.

```
Block 2:
            Class PolicyGroup class PolicyGroup subclass of ManagedObject
    /* Attributes */
        set_of_children_ManagedObjects;
        set_of_policies;
    /* _functions */
        getPolicies(class_of_ManagedObject,
            name_of_attribute):
        returns (a set of policies);
        class_of self ();
end class PolicyGroup
/* function definitions for PolicyGroup */
function getPolicies(className_of_ManagedObject,
name_of_attribute)
    create an empty return_set_of_policies;
    for each policy in set _ of _ policies do:
        if (policy.classname ==
            className_of_ManagedObject AND
            policy.attributeName ==
            name_ofattribute)
        then
            add policy to return_set_of_policies;
        end if;
    end for loop;
    for each parent in set_of_parent_PolicyGroups do:
        set_of_policies =
        Parent. getPolicies (className_of_ManagedObject,
        name of_attribute);
            add set_of_policies to
                return_set_of_policies;
    end for loop;
    return return_set_of_policies;
end function getPolicies
function class_of _self()
    return "PolicyGroup"
end function class_of_self;
```

With respect to the pseudocode of Block 3 hereinafter, an example of class policy is shown. It should be reiterated that policy groups contain a list of policies, and each policy in that list has a class name and attribute to indicate to what the policy applies. The policy expression, in fact, may be the policy itself. Each policy has a function called "validate" and the proposed value is placed in the policy to return a "true" or "false" indication for the value.

```
Block 3:
            Class Policy class Policy
    /* Attributes */
        className; /* name of the class of Managed
            Object this policy applies */
        attributeName; /* name of the attribute of the
            class className */
        policyExpression;
    /* functions */
    validate(aProposedAttributeValue) return
        (Boolean);
end class Policy
/* Function Definitions for Policy*/
    validate(aProposedAttributeValue) /*
        use aProposedAttributeValue in the system
        administrator defined policy expression. The
        result of the policy expression is returned.
    end function validate
```

Figure 13:
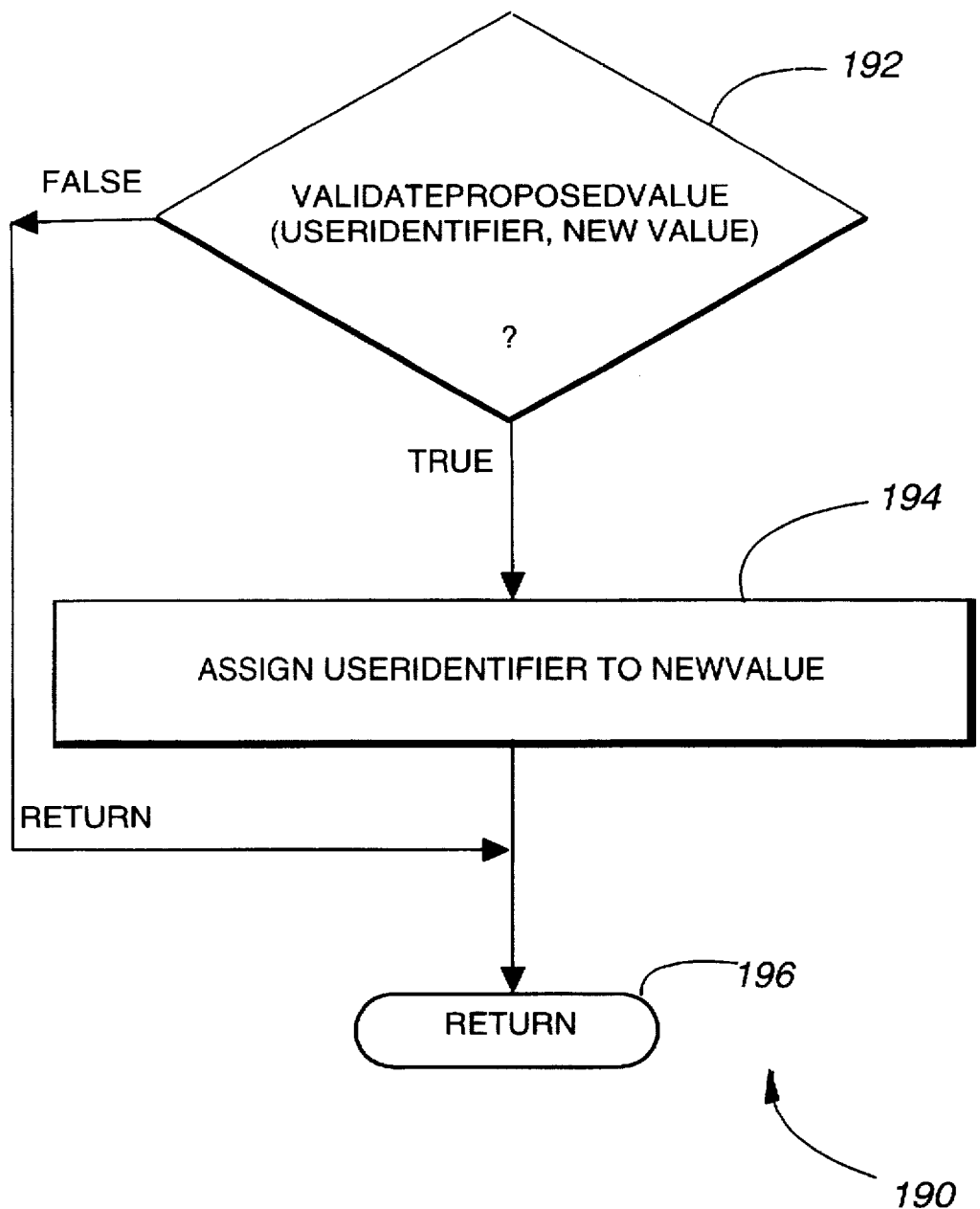
FIG. 13 is a representative flow chart for the implementation of the function: User::set_UserIdentifier(newValue).

With reference additionally now to FIG. 13 and the following pseudocode of Block 4, an example of a class which checks policy is shown. The process 190 begins at decision step 192 to where the proposed value is tested as to UserIdentifier and newvalue to validate to true. If true, the UserIdentifer is assigned to newvalue at step 194 and the process 190 is completed at return step 196. If false, step 194 is bypassed directly to return step 196.

```
Block 4:
        An Example of a class which checks Policy class User subclass of Managed Object
    /* attributes */
        UserIdentifier;
    /* functions */
        class of self();
        set_UserIdentifier(newValue) returns error
            code;
end class User
/* Function Definitions for User */
function class of self()
    return "User";
end function;
function set UserIdentifier(newValue)
    if
    (validateProposedValue("UserIdentifier", newValue)
        then
            UserIdentifier = newValue;
    end if;
end function set_UserIdentifier;
```

The system and method for implementing a hierarchical policy for computer system administration disclosed herein is very flexible in assigning policies to managed objects. As stated previously, policies are rules for the values of the attributes of managed objects. Policy groups are the basic building block of this model and they associate a set of policies with a set of managed objects. Further, policy groups can be members of other policy groups and a policy group inherits the policies of its parent policy groups. This feature can be used to support the hierarchical specification of policy. Moreover, the system and method herein disclosed allows a given policy group to have multiple parents which, in turn, allows the "mix-in" of policies from the parents.

System administrators may use the standardization of the managed object configuration as a means to reduce the burden of administering large numbers of instances of a given class of managed objects. Standardization reduces the complexity of the day-to-day system administration function because there is less information to maintain and understand and because there are fewer special cases. Thus, the standardization herein proposed makes it easier to optimize and troubleshoot particular configurations. Utilizing cloning and templates provides a voluntary means for standardization while validation policies and policy groups provide more of a mandatory means of standardization.

Reduction or limiting the damage of non-malicious misuse is supported via policies. Specifically, polices can be used to restrict the set of values for a given attribute to a "safe" set of values and the policy group mechanism insures that a managed object's attributes can only assume safe values.

While there have been described above the principles of the present invention in conjunction with a specific client-server computer architecture and programming examples, it is to be clearly understood that the foregoing description is made only by way of example and not as a limitation to the scope of the invention. Particularly, while the system and method of the present invention has been applied with specificity to computer system administration and management functions in the examples discussed, the same techniques can be applied, for example, to software development wherein rules for the values of attributes of managed objects may be placed thereon.

What is claimed is:

1. A method for implementing a hierarchical policy for administration of a computer system having at least one computer, an associated database and a user interface for inputting data to said database, said method comprising the steps of:

providing for storing of a number of policies in said database, said policies each having an associated policy class name and policy attribute;

providing for organizing of said policies into policy groups;

providing for inputting of characteristics of an input managed object to said computer system, said input managed object having an associated input object class name and an associated input object attribute having a proposed value;

providing for searching of certain of said policy groups pertinent to said input managed object to determine policies within said policy groups having a policy class name and policy attribute corresponding to said input object class name and input object attribute;

providing for returning of a matching subset of policies from said policy groups which have a policy class name and policy attribute corresponding to said input object class name and input object attribute;

providing for analyzing of said proposed value of said input object attribute of said input managed object with respect to said matching subset of policies; and providing for allowing of entry of said proposed value of said input object attribute if said proposed value passes each of said policies in said matching subset of policies.

2. The method of claim 1 wherein said step of providing for searching further comprises the steps of:

providing for recursively searching of said policy groups to determine parent policy groups of said input managed object having a policy class name and policy attribute corresponding to said input object class name and input object attribute;

providing for additionally returning of an additional subset of said policies from said parent policy groups which have a policy class name and policy attribute corresponding to said input object class name and input object attribute; and providing for adding of said additional subset of said policies to said matching subset of policies prior to said step of providing for returning.

3. The method of claim 2 wherein said step of providing for recursive searching is carried out by the steps of:

providing for initially searching said certain policy groups to identify said policies having a policy class name and policy attribute corresponding to said input object class name and input object attribute; and providing for secondarily searching of policies of said parent policy groups to identify policies of said parent policy groups having a policy class name and policy attribute corresponding to said input object class name and input object attribute.

4. The method of claim 1 wherein said step of providing for storing is carried out by means of a computer mass storage device operatively coupled to said computer system.

5. The method of claim 1 wherein said step of providing for organizing is carried out by the steps of:

providing for determining of common applicabilities of said policies to various of said managed object class names and said object attributes;

providing for grouping of said policies in said policy groups according to said common applicabilities.

6. The method of claim 1 wherein said step of providing for inputting is carried out by providing for entry of said input object class name and proposed value of said input object attribute to said computer system.

7. The method of claim 1 further comprising the steps of:

providing an additional computer coupled to said computer system, said additional computer functioning as a server with respect to said at least one computer functioning as a client, said additional computer operative for controlling said database.

8. The method of claim 7 wherein said steps of providing for storing, searching and returning are carried out by said additional computer.

9. The method of claim 7 wherein said steps of providing for analyzing and allowing are carried out by said at least one computer.

10. The method of claim 1 further comprising the steps of:

providing for cloning of an associated object class name and an associated object attribute of a previously input managed object; and providing for the utilization of said associated object class name and said associated object attribute to produce a modifiable initial representation of said input object class name and said input object attribute of said input managed object.

11. The method of claim 1 further comprising the step of:
providing for creating a template to establish an initial value for said input object attribute of said input managed object.

12. The method of claim 1 further comprising the step of:
providing for disallowing of entry of said proposed value of said input object attribute if said proposed value fails any one of said policies in said matching subset of policies.

13. The method of claim 1 further comprising the step of:
providing for conditionally allowing of entry of said proposed value of said input object attribute if said proposed value fails an advisory one of said policies in said matching subset of policies.

14. A computer program product comprising:
a computer usable medium having computer readable code embodied therein for implementing a hierarchical policy for administration of a computer system having at least one computer, an associated database and a user interface for inputting data to said database, the computer program product comprising:
computer readable program code devices configured to cause a computer to effect storing a number of policies in said database, said policies each having an associated policy class name and an associated policy attribute;
computer readable program code devices configured to cause a computer to effect organizing said policies into policy groups;
computer readable program code devices configured to cause a computer to effect inputting characteristics of an input managed object to said computer system, said input managed object having an associated input object class name and an associated input object attribute having a proposed value;
computer readable program code devices configured to cause a computer to effect searching certain of said policy groups pertinent to said input managed object to determine policies thereof having a policy class name and policy attribute corresponding to said input object class name and input object attribute;
computer readable program code devices configured to cause a computer to effect returning a matching subset of said policies from said policy groups which have a policy class name and policy attribute corresponding to said input object class name and input object attribute;
computer readable program code devices configured to cause a computer to effect analyzing said proposed value of said input object attribute with respect to said matching subset of said policies; and
computer readable program code devices configured to cause a computer to effect allowing entry of said proposed value of said input object attribute if said proposed value passes each of said policies in said matching subset of policies.

15. The computer program product of claim 14 further comprising:
computer readable program code devices configured to cause a computer to effect recursively searching said policy groups to determine parent policy groups of said input managed object having a policy class name and policy attribute corresponding to said input object class name and input object attribute;
computer readable program code devices configured to cause a computer to effect additionally returning an additional subset of said policies from said parent policy groups which have a policy class name and policy attribute corresponding to said input object class name and input object attribute; and
computer readable program code devices configured to cause a computer to effect adding said additional subset of said policies to said matching subset of policies prior to said step of returning.

16. The computer program product of claim 15 wherein said computer readable program code devices are configured to cause a computer to effect said searching of said policies is carried out by:
computer readable program code devices configured to cause a computer to effect initially searching said policies of said certain policy groups to identify said policies having a policy class name and policy attribute corresponding to said input object class name and input object attribute; and
computer readable program code devices configured to cause a computer to effect secondarily searching said policies of said parent policy groups to identify policies of said parent policy groups of said managed object having a policy class name and policy attribute corresponding to said input object class name and input object attribute.

17. The computer program product of claim 14 wherein said computer readable program code devices are configures to cause a computer to effect said organizing of said policies is carried out by:
computer readable program code devices configured to cause a computer to effect determining common applicabilities of said policies to various of said managed object class names and said object attributes;
computer readable program code devices configured to cause a computer to effect providing for grouping of said policies in said policy groups according to said common applicabilities.

18. The computer program product of claim 14 further comprising:
computer readable program code devices configured to cause a computer to effect cloning of an associated object class name and an associated object attribute of a previously input managed object; and
computer readable program code devices configured to cause a computer to effect utilization of said associated object class name and said associated object attribute to produce a modifiable initial representation of said input object class name and said input object attribute.

19. The computer program product of claim 14 further comprising:
computer readable program code devices configured to cause a computer to effect creating a template to establish an initial value for said input object attribute.

20. The computer program product of claim 14 further comprising:
computer readable program code devices configured to cause a computer to effect disallowing entry of said proposed value of said input object attribute if said proposed value fails any one of said policies in said matching subset of policies.

21. The computer program product of claim 14 further comprising:
computer readable program code devices configured to cause a computer to effect providing for conditionally allowing of entry of said proposed value of said input object attribute if said proposed value fails an advisory one of said policies in said matching subset of said policies.

22. A computer system capable of implementing a hierarchical policy administration, said computer system comprising:

at least one computer;

at least one database retained within a computer mass storage device operatively coupled to said computer, said database being capable of storing a number of policies having an associated policy class name and an associated policy attribute;

a user interface operatively coupled to said at least one computer, said user interface capable of allowing input of characteristics of an input managed object to said computer system, said input managed object having an associated input object class name and an associated input object attribute having a proposed value;

an associator operable in conjunction with said at least one computer and said database for organizing said policies into policy groups;

an iterator operable in conjunction with said at least one computer and said database for searching certain of said policy groups pertinent to said input managed object to determine policies thereof having a policy class name and policy attribute corresponding to said input object class name and input object attribute;

a matching subset of said policies from said policy groups returned by said iterator to said at least one computer which have a policy class name and policy attribute corresponding to said input object class name and input object attribute;

an analyzer operable in conjunction with said at least one computer for testing said proposed value of said input object attribute with respect to said matching subset of said policies; and an input validator operable in conjunction with said at least one computer and said user interface and responsive to said analyzer, said input validator allowing entry of said proposed value of said input object attribute if said proposed value passes each of said policies in said matching subset of said policies.

23. The computer system of claim 22 further comprising:

a recursive iterator operable in conjunction with said at least one computer and said database for searching said policy groups to determine parent policy groups of said input managed object having a policy class name and policy attribute corresponding to said input object class name and input object attribute;

an additional subset of said policies from said parent policy groups which have a policy class name and policy attribute corresponding to said input object class name and input object attribute; and a summer for adding said additional subset of said policies to said matching subset of said policies.

24. The computer system of claim 22 further comprising an additional computer coupled to said computer system for operatively controlling said database and functioning as a server with respect to said at least one computer.

25. The computer system of claim 22 further comprising a cloning implementor for utilizing an associated class name and associated object attribute of an associated managed object previously input to said computer system to produce a modifiable initial representation of said input object class name and said input object attribute.

26. The computer system of claim 22 further comprising a template creator for establishing an initial value for said input object attribute.

27. The computer system of claim 22 wherein said input validator further comprises an input disallower for disallowing entry of said proposed value of said input object attribute if said proposed value fails any one of said policies in said matching subset of policies.

28. The computer system of claim 22 wherein said input validator further comprises a conditional input validator for conditionally allowing entry of said proposed value of said input object attribute if said proposed value fails an advisory one of said policies in said matching subset of policies.

29. A method for implementing a hierarchical policy for a computer system having at least one computer, an associated database and a user interface for inputting data to said computer system, said method comprising the steps of:

providing for organizing of a number of policies in said database into policy groups, each of said policies having an associated policy class name and an associated policy attribute;

providing for inputting of characteristics of an input managed object to said computer system, said input managed object having an associated input object class name and an associated input object attribute having a proposed value;

providing for analyzing of said proposed value of said input object attribute with respect to policies in pertinent ones of said policy groups having a policy class name and policy attribute corresponding to said input object class name and input object attribute; and providing for allowing of entry of said proposed value of said input object attribute if said proposed value passes each of said policies in said pertinent ones of said policy groups.

30. The method of claim 29 wherein said step of analyzing further comprises the steps of:

providing for searching of said database for certain of said policy groups pertinent to said input managed object to determine policies thereof having a policy class name and policy attribute corresponding to said input object class name and input object attribute; and providing for returning of a matching subset of said policies from said policy groups which have a policy class name and policy attribute corresponding to said input object class name and input object attribute.

31. The method of claim 30 wherein said step of providing for searching further comprises the steps of:

providing for recursively searching of said policy groups to determine parent policy groups of said input managed object having a policy class name and policy attribute corresponding to said input object class name and input object attribute;

providing for additionally returning of an additional subset of said policies from said parent policy groups which have a policy class name and policy attribute corresponding to said input object class name and input object attribute; and providing for adding of said additional subset of said policies to said policies from said pertinent ones of said policy groups prior to said step of providing for returning.

32. The method of claim 30 wherein said step of providing for searching is carried out by the steps of:

providing for initially searching of said policies of said certain policy groups to identify said policies having a policy class name and policy attribute corresponding to said input object class name and input object attribute; and providing for secondarily searching of said policies of said parent policy groups to identify policies of said parent policy groups of said input managed object having a policy class name and policy attribute corresponding to said input object class name and input object attribute.

33. The method of claim 29 wherein said step of providing for organizing is carried out by the steps of:

providing for determining of common applicabilities of said policies to various of said managed object class names and said object attributes; and providing for grouping of said policies in said policy groups according to said common applicabilities.

34. The method of claim 29 wherein said step of providing for inputting is carried out by providing for entry of said input object class name and proposed value of said input object attribute to said computer system.

35. The method of claim 29 further comprising the steps of:

providing an additional computer coupled to said computer system, said additional computer functioning as a server with respect to said at least one computer functioning as a client, said additional computer operative for controlling said database.

36. The method of claim 35 wherein said steps of providing for searching and returning are carried out by said additional computer.

37. The method of claim 35 wherein said steps of providing for analyzing and allowing are carried out by said at least one computer.

38. The method of claim 29 further comprising the steps of:

providing for cloning of an associated object class name and an associated object attribute of a previously input managed object; and providing for the utilization of said associated object class name and said associated object attribute to produce a modifiable initial representation of said input object class name and said input object attribute.

39. The method of claim 29 further comprising the step of:

providing for creating a template to establish an initial value for said input object attribute.

40. The method of claim 29 further comprising the step of:

providing for disallowing of entry of said proposed value of said input object attribute if said proposed value fails any one of said policies in said pertinent ones of said policy groups.

41. The method of claim 29 further comprising the step of:

providing for conditionally allowing of entry of said proposed value of said input object attribute if said proposed value fails an advisory one of said policies in said pertinent ones of said policy groups.

42. A computer program product comprising:

a computer usable medium having computer readable code embodied thereon for implementing a hierarchical policy for a computer system having at least one computer, an associated database and a user interface for inputting data to said computer system, the computer program product comprising:

computer readable program code devices configured to cause a computer to effect organizing of a number of policies in said database into policy groups, each of said policies having an associated policy class name and an associated policy attribute;

computer readable program code devices configured to cause a computer to effect inputting of characteristics of an input managed object to said computer system, said input managed object having an associated input object class name and an associated input object attribute having a proposed value;

computer readable program code devices configured to cause a computer to effect analyzing of said proposed value of said input object attribute with respect to policies in pertinent ones of said policy groups having a policy class name and policy attribute corresponding to said input object class name and input object attribute; and computer readable program code devices configured to cause a computer to effect allowing of entry of said proposed value of said input object attribute if said proposed value passes each of said policies in said pertinent ones of said policy groups.

43. The computer program product of claim 42 wherein said computer readable program code devices configured to cause a computer to effect analyzing is further carried out by:

computer readable program code devices configured to cause a computer to effect searching of said database for certain of said policy groups pertinent to said input managed object to determine policies thereof having a policy class name and policy attribute corresponding to said input object class name and input object attribute; and computer readable program code devices configured to cause a computer to effect returning of a matching subset of said policies from said policy groups which have a policy class name and policy attribute corresponding to said input object class name and input object attribute.

44. The computer program product of claim 43 wherein said computer readable program code devices configured to cause a computer to effect analyzing is further carried out by:

computer readable program code devices configured to cause a computer to effect recursively searching of said policy groups to determine parent policy groups of said input managed object having a policy class name and policy attribute corresponding to said input object class name and input object attribute;

computer readable program code devices configured to cause a computer to effect additionally returning of an additional subset of said policies from said parent policy groups which have a policy class name and policy attribute corresponding to said input object class name and input object attribute; and computer readable program code devices configured to cause a computer to effect adding of said additional subset of said policies to said policies in said pertinent ones of said policy groups prior to said step of providing for returning.

45. The computer program product of claim 43 wherein said computer readable program code devices configured to cause a computer to effect searching is carried out by:

computer readable program code devices configured to cause a computer to effect initially searching of said policies of said certain policy groups to identify said policies having a policy class name and policy attribute corresponding to said input object class name and input object attribute; and computer readable program code devices configured to cause a computer to effect secondarily searching of said policies of said certain policy groups to identify policies of said parent policy groups of i said managed object having a policy class name and policy attribute corresponding to said input object class name and input object attribute.

46. The computer program product of claim 42 wherein said computer readable program code devices configured to cause a computer to effect organizing is carried out by:

computer readable program code devices configured to cause a computer to effect determining of common applicabilities of said policies to various of said managed object class names and said object attributes; and computer readable program code devices configured to cause a computer to effect grouping of said policies in said policy groups according to said common applicabilities.

47. The computer program product of claim 42 wherein said computer readable program code devices configured to cause a computer to effect inputting is carried out by:

computer readable program code devices configured to cause a computer to effect entry of said input object class name and proposed value of said input object attribute to said computer system.

48. The computer program product of claim 42 further comprising:

computer readable program code devices configured to cause a computer to effect cloning of an associated object class name and an associated object attribute of a previously input managed object; and computer readable program code devices configured to cause a computer to effect utilization of said associated object class name and said associated object attribute to produce a modifiable initial representation of said input object class name and said input object attribute.

49. The computer program product of claim 42 further comprising:

computer readable program code devices configured to cause a computer to effect creating a template to establish an initial value for said input object attribute.

50. The computer program product of claim 42 further comprising:

computer readable program code devices configured to cause a computer to effect disallowing of entry of said proposed value of said input object attribute if said proposed value fails any one of said policies in said pertinent ones of said policy groups.

51. The computer program product of claim 42 further comprising:

computer readable program code devices configured to cause a computer to effect conditionally allowing of entry of said proposed value of said input object attribute if said proposed value fails an advisory one of said policies in said pertinent ones of said policy groups.

* * * * *